(12) United States Patent
Hannu et al.

(10) Patent No.: US 10,764,610 B2
(45) Date of Patent: Sep. 1, 2020

(54) MEDIA USER CLIENT, A MEDIA USER AGENT AND RESPECTIVE METHODS PERFORMED THEREBY FOR PROVIDING MEDIA FROM A MEDIA SERVER TO THE MEDIA USER CLIENT

(71) Applicant: TELEFONAKTIEBOLAGET LM ERICSSON (PUBL), Stockholm (SE)

(72) Inventors: Hans Hannu, Luleå (SE); Ingemar Johansson, Luleå (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 15/736,840

(22) PCT Filed: Jul. 3, 2015

(86) PCT No.: PCT/SE2015/050787
§ 371 (c)(1),
(2) Date: Dec. 15, 2017

(87) PCT Pub. No.: WO2017/007376
PCT Pub. Date: Jan. 12, 2017

(65) Prior Publication Data
US 2018/0176615 A1    Jun. 21, 2018

(51) Int. Cl.
*H04N 21/643* (2011.01)
*H04N 21/2387* (2011.01)
(Continued)

(52) U.S. Cl.
CPC ..... *H04N 21/23406* (2013.01); *H04L 65/605* (2013.01); *H04L 65/608* (2013.01);
(Continued)

(58) Field of Classification Search
CPC combination set(s) only.
See application file for complete search history.

(56) References Cited

U.S. PATENT DOCUMENTS

| 2005/0144317 A1 | 6/2005 | Chase et al. |
| 2013/0028088 A1* | 1/2013 | Do .................. H04L 1/0002 370/235 |

(Continued)

FOREIGN PATENT DOCUMENTS

| WO | 2014/069905 A1 | 5/2014 |
| WO | 2014093717 A1 | 6/2014 |

(Continued)

OTHER PUBLICATIONS

A. El Essaili et al., "Quality-of-Experience driven Adaptive HTTP Media Delivery", 2013 IEEE International Conference on Communications (ICC), Jun. 9-13, 2013, Budapest, Hungary, pp. 1-6.
(Continued)

*Primary Examiner* — Hsiungfei Peng
(74) *Attorney, Agent, or Firm* — Patent Portfolio Builders, PLLC

(57) ABSTRACT

A media user agent, a media user client and respective methods performed thereby for providing media from a media server to the media user client in a user terminal are provided. The method performed by the media user agent in a node in a communication network for providing media from a media server to a media user client in a user terminal comprises receiving a request for media from the media user client, the request for media comprising information about the requested media; and transmitting a request of the media to a media server, the request comprising the information about the requested media. The method further comprises receiving an MPD from the media server; and autonomously requesting segment(s) of the media from the media server based on the MPD.

34 Claims, 8 Drawing Sheets

(51) Int. Cl.

| | | |
|---|---|---|
| *H04N 21/239* | (2011.01) | |
| *H04N 21/234* | (2011.01) | |
| *H04N 21/845* | (2011.01) | |
| *H04N 21/442* | (2011.01) | |
| *H04N 21/262* | (2011.01) | |
| *H04N 21/44* | (2011.01) | |
| *H04N 21/84* | (2011.01) | |
| *H04N 21/222* | (2011.01) | |
| *H04L 29/06* | (2006.01) | |

(52) U.S. Cl.
CPC .......... *H04L 69/08* (2013.01); *H04N 21/222* (2013.01); *H04N 21/2387* (2013.01); *H04N 21/2393* (2013.01); *H04N 21/26258* (2013.01); *H04N 21/44004* (2013.01); *H04N 21/44209* (2013.01); *H04N 21/643* (2013.01); *H04N 21/84* (2013.01); *H04N 21/8456* (2013.01)

(56) References Cited

U.S. PATENT DOCUMENTS

| | | | |
|---|---|---|---|
| 2014/0025830 A1 | 1/2014 | Grinshpun et al. | |
| 2014/0226560 A1* | 8/2014 | Parron | H04W 24/02 370/328 |
| 2014/0337411 A1 | 11/2014 | Panje et al. | |
| 2015/0295976 A1 | 10/2015 | Lee et al. | |
| 2015/0326572 A1* | 11/2015 | Oyman | H04N 21/23439 726/4 |
| 2016/0219091 A1* | 7/2016 | Gabin | H04L 65/605 |

FOREIGN PATENT DOCUMENTS

| | | |
|---|---|---|
| WO | 2014/113193 A1 | 7/2014 |
| WO | 2014113197 A1 | 7/2014 |
| WO | 2014163691 A1 | 10/2014 |
| WO | 2015004276 A2 | 1/2015 |
| WO | 2015042106 A1 | 3/2015 |

OTHER PUBLICATIONS

International Standard ISO/IEC 14496-12, "Information technology—Coding of audio-visual objects—Part 12: ISO base media file format", Sep. 15, 2012, pp. 1-196.

International Standard ISO/IEC 23009-1, "Information technology—Dynamic adaptive streaming over HTTP (DASH)—Part 1: Media presentation description and segment formats", May 15, 2014, pp. 1-152.

Ozgur Oyman et al., "Quality of Experience for HTTP Adaptive Streaming Services", IEEE Communications Magazine, Apr. 2012, pp. 20-27.

Te-Yuan Huang et al., "A Buffer-Based Approach to Rate Adaptation: Evidence from a Large Video Streaming Service", Proceedings of the 2014 ACM conference on SIGCOMM, Aug. 17-22, 2014, Chicago, Illinois, pp. 187-198.

Te-Yuan Huang et al., "Confused, Timid, and Unstable: Picking a Video Streaming Rate is Hard", Proceedings of the 2012 Internet Measurement Conference, Nov. 14-16, 2012, Boston, Massachusetts, pp. 225-238.

International Search Report and Written Opinion, dated Apr. 1, 2016, from corresponding PCT Application No. PCT/SE2015/050787.

Extended European Search Report received in related Application No. 15897831.2, dated Oct. 12, 2018, 9 pages.

* cited by examiner

MEDIA USER CLIENT, A MEDIA USER AGENT AND RESPECTIVE METHODS PERFORMED THEREBY FOR PROVIDING MEDIA FROM A MEDIA SERVER TO THE MEDIA USER CLIENT

TECHNICAL FIELD

The present disclosure relates to wireless communication and in particular to providing media to a user of a user terminal, the user terminal being operable in a wireless communication network.

BACKGROUND

Generally streaming media services entities are a client and a server, which represents the two endpoints involved in providing the media to a user of a user terminal, wherein the client is generally implemented in the user terminal. The media content, e.g. video, may be distributed on several servers on e.g. the Internet, and the client's requests are directed towards the most suitable server, e.g. the closest and/or the one that currently serves least amount of other clients.

More and more online video services are utilising video rate adaptation in order to provide a good user Quality of Experience, QoE, in varying network conditions. In the marketplace, several different versions of Hypertext Transfer Protocol, HTTP, adaptive streaming are implemented by different vendors such as HTTP Dynamic Streaming, HDS, developed by Adobe, HTTP Smooth Streaming, HSS, implemented by Microsoft, HTTP Live Streaming, HLS, provided by Apple. Dynamic adaptive streaming over HTTP, DASH, also named HTTP Adaptive Streaming, HAS, has been adopted by the $3^{rd}$ Generation Partnership Project, 3GPP, targeting to unify behaviours for different vendors. The video server may be incorporated in normal web servers with storage of video representation with different codec rates.

In DASH (and most of the other versions), a video clip is composed of multiple representation layers with different resolutions. Each layer is encoded with Constant Bit Rate, CBR, or Variable Bit Rate, VBR, encoding algorithms. Such organisation gives finer scalability which can adapt to the client variants and different network bandwidths. At the start of a video session, the client fetches a Media Presentation Description, MPD, from the streaming server, or media server, for the requested video clip. The MPD conveys detailed characteristics of the requested video clip using a hierarchical data model, which for example includes the timing, segmentation duration, Uniform Resource Locator (URL), video bitrates, resolutions etc. Based on the information in the MPD the client initiates a video request with the initial rate (which is typically a low rate) to the video server. The video request is followed by a bundle of video frames transmitted by the streaming server, or media server. The bundle of video frames also called video segments is composed of consecutive frames in a time interval of several seconds. The client may select a new media rate, from the rates given by the MPD, based on the estimated available network throughput and/or the amount of video in a play-out buffer of the client.

Hence, the client consists of:
  A user application interface, API, that interacts with the user and provides, videos to select from, and play-out control functions, such as play, rewind, fast forward, pause.
  A display and speakers, on which the user looks and hears the media.
  A play-out (playback) buffer, that contains the media to render (playback) to the user on the display.
  A playback point function, which keeps track of where in the media file the playback is.
  A media rendering functionality, which takes media from the play-out buffer and playback it to the user.
  A media rate adaptation algorithm, commonly based on throughput/bandwidth estimates, or play-out buffer level that selects based on the MPD information which segment to fetch.
  A media get (fetch) functionality from the server, commonly based on HTTP.

Several problems may arise with the client-server solution described above. It may be hard to perform accurate DASH client-side bandwidth or throughput estimation above the HTTP layer. As a result, video rate adaptation may be based on inaccurate estimates which may lead to undesirably variable and low-quality video. In order to overcome this problem, buffer-based rate adaptation algorithm may be used that does the rate selection based on the current buffer level. However, although the buffer-based rate adaptation reduces the buffer underrun and may increase the media rate through the session it suffers from increased rate changes that may negatively affect the QoE, furthermore, buffer based adaptation typically require large play-out buffers in order to get a reasonably stable rate control loop. To reduce the amount of rate changes it may be possible to look ahead on the sizes of potential coming segments, and also consider that in the rate selection. Still, during peak hours the media rate achieved with the buffer based and look ahead scheme for media rate adaptation is lower than the common bandwidth or throughput estimate based rate adaptation. This is due to that the client lacks full knowledge of the system load as the client cannot conceive what happens with other clients sharing the same resources.

SUMMARY

The object is to obviate at least some of the problems outlined above. In particular, it is an object to provide a media user agent, a media user client and respective methods performed thereby for providing media from a media server to the media user client in a user terminal. These objects and others may be obtained by providing a media user agent and a media user client and a method performed by a media user agent and a media user client according to the independent claims attached below.

According to an aspect, a method performed by a media user agent in a node in a communication network for providing media from a media server to the media user client in a user terminal is provided. The method comprises receiving a request for media from the media user client, the request for media comprising information about the requested media; and transmitting a request of the media to a media server, the request comprising the information about the requested media. The method further comprises receiving a Media Presentation Description, MPD, from the media server; and autonomously requesting segment(s) of the media from the media server based on the MPD.

According to an aspect, a method performed by a media user client in a user terminal is provided for providing media to a user of the user terminal, wherein the media user client in the user terminal communicates with a media user agent in a node in a communication network. The method comprises receiving a request for a media from a user of the user terminal; and transmitting a request for the media to the media user agent, the request comprising information about the requested media and wherein said request indicates that the media user agent may autonomously request segment(s) of the media from the media server.

According to an aspect, a media user agent operable in a communication network is provided for providing media from a media server to a media user client in a user terminal. The media user agent is configured for receiving a request for media from the media user client, the request for media comprising information about the requested media; and transmitting a request of the media to a media server, the request comprising the information about the requested media. The media user agent is further configured for receiving an MPD from the media server; and autonomously requesting segment(s) of the media from the media server based on the MPD.

According to an aspect, a media user client operable in a communication network is provided for providing media to a user of the user terminal, wherein the media user client communicates with a media user agent in a node in the communication network. The media user client is configured for receiving a request for a media from a user of the user terminal; and transmitting a request for the media to the media user agent, the request comprising information about the requested media and wherein said request indicates that the media user agent may autonomously request segment(s) of the media from the media server.

The media user agent, the media user client and the respective method performed by the media user agent and the media user client have several advantages. One possible advantage is that the amount of uplink traffic may be reduced thanks to the media user client not having to request segments of the media, since the media user agent requests (and thus fetches) the segment without any request is transmitted on the uplink between the user terminal and the node in the communication network. Yet another possible advantage is that, since the media user agent is responsible for the fetching of and the providing of segments of media to the media user client by requesting the segments and receiving the segments from the media server, the realisation of network knowledge in media rate adaptation is simplified since the node in the communication network may easier know and/or obtain information about current network characteristics than the media user client in the user terminal. It is easier for the media user agent as compared to the media user client to collect information from the node to optimise the task of providing the media to the user of the user terminal. In addition a centralised function in the node may boost transfer speed for a given user agent based on local optimisation. This intelligence is difficult to have on the client side since it requires extra signalling of low level attributes and also raises trust issues. Yet a possible advantage is that the solution provides a natural split between the functionality of the media user client and server transport layer connection, which in turn allows for optimised transport solutions for the two significantly different links: the radio link between the user terminal and the node in the communication network, and the transport network link between the node in the communication network and the media server. Still a possible advantage is that a better Quality of Experience, QoE, is achieved in terms of higher average session rate, less number of rate switches, graceful degradation of media rate, which in turn may lead to an increased number of QoE satisfied users in the communication network.

BRIEF DESCRIPTION OF DRAWINGS

Embodiments will now be described in more detail in relation to the accompanying drawings, in which.

DETAILED DESCRIPTION

Briefly described, a media user agent, a media user client and respective methods performed thereby for providing media from a media server to the media user client in a user terminal are provided.

By introducing the media user agent, parts of the media user client is removed therefrom and instead put in the media user agent. The functionality of fetching the media, i.e. segments thereof, is removed from the media user client and is instead carried out by the media user agent, which then provides the fetched media to the media user client. By fetching the media is meant requesting and receiving the media from a media server. Other functionality is also carried out by the media user agent as will be described in more detail below.

Embodiments herein relate to a method performed by a media user agent in a node in a communication network for providing media from a media server to a media user client in a user terminal. Exemplifying embodiments of such a method will now be described with reference to FIGS. 1a-1e.

Figure 1A:
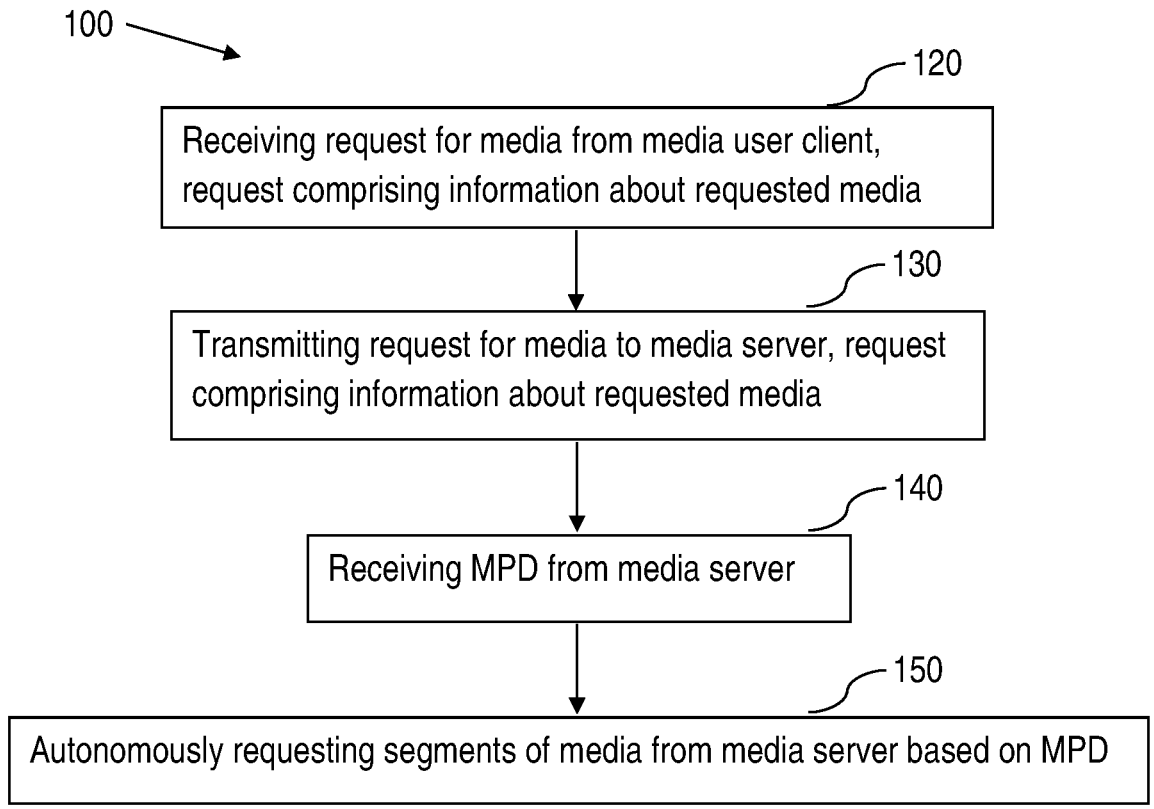
FIG. 1a is a flowchart of a method performed by a media user agent in a node in a communication network for providing media from a media server to the media user client in a user terminal, according to an exemplifying embodiment.
Figure 1B:
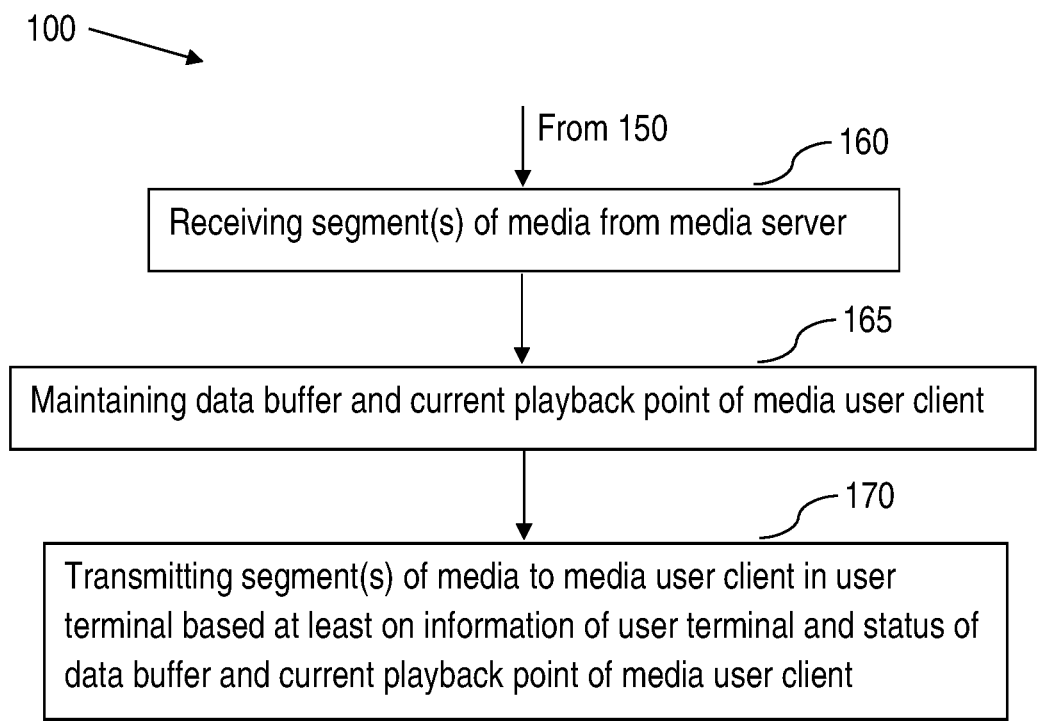
FIG. 1b is a flowchart of a method performed by a media user agent in a node in a communication network for providing media from a media server to the media user client in a user terminal, according to yet an exemplifying embodiment.
Figure 1C:
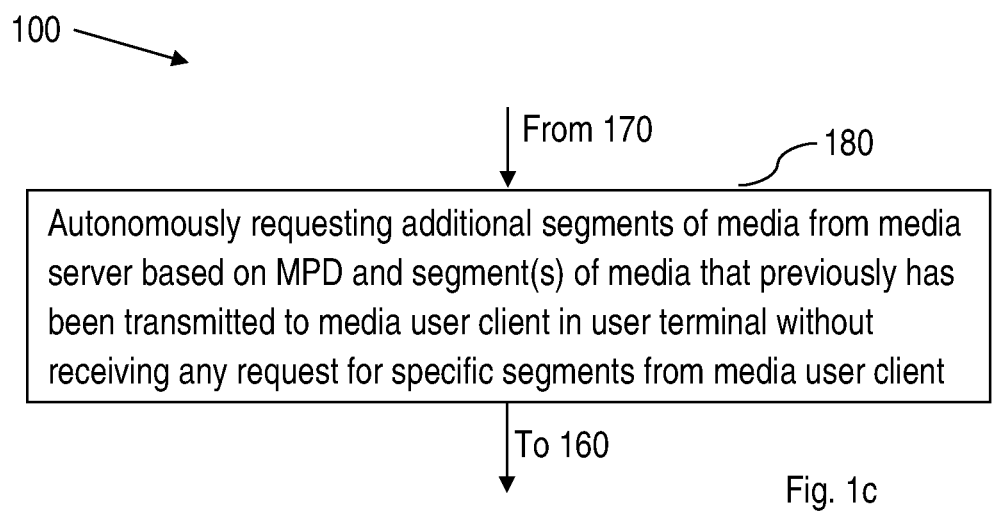
FIG. 1c is a flowchart of a method performed by a media user agent in a node in a communication network for providing media from a media server to the media user client in a user terminal, according to still an exemplifying embodiment.
Figure 1D:
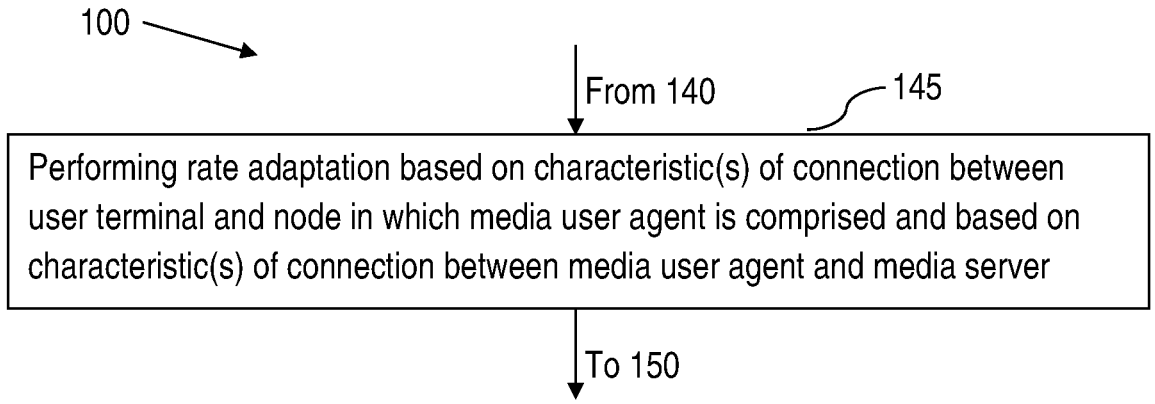
FIG. 1d is a flowchart of a method performed by a media user agent in a node in a communication network for providing media from a media server to the media user client in a user terminal, according to another exemplifying embodiment.
Figure 1E:
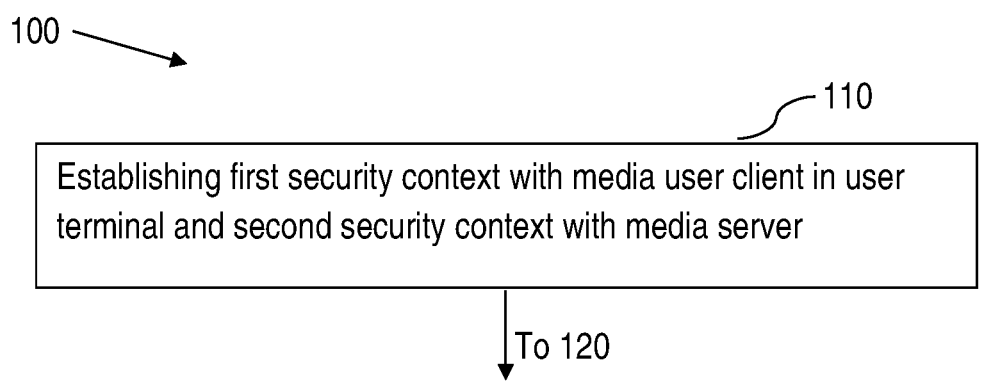
FIG. 1e is a flowchart of a method performed by a media user agent in a node in a communication network for providing media from a media server to the media user client in a user terminal, according to an exemplifying embodiment.

FIG. 1a is a flowchart of a method performed by a media user agent in a node in a communication network for providing media from a media server to a media user client in a user terminal according to an exemplifying embodiment. FIG. 1a illustrates the method 100 comprising receiving 120 a request for media from the media user client, the request for media comprising information about the requested media; and transmitting 130 a request of the media to a media server, the request comprising the information about the requested media. The method 100 further comprises receiving 140 an MPD from the media server; and autonomously requesting 150 segment(s) of the media from the media server based on the MPD.

When a user of the terminal wishes to be provided with media, for example a video clip, the user requests the media by means of the user client in the user terminal. The media user agent in the node in the communication network cooperates with the media user client in order to retrieve the requested media and present the media to the user on the user terminal.

The media user client sends a request for the media to the media user agent. Consequently, the method performed by the media user agent comprises the media user agent receiving the request for the media. The request comprises an identifier of the requested media, e.g. a title, a link or web-address or any other identifier which enables the media user agent to know what media is requested. In this manner, the media user agent receives information about the requested media from the media user client in the user terminal.

The media user agent then transmits the request of the media to a media server, the request comprising the information about the requested media. The media user agent may use the information about the requested media in order to find the appropriate media server holding the requested media. The manner in which the media user agent locates the appropriate media server is out of scope of this disclosure.

In response to the requested media, the media server sends the MPD to the media user agent. The MPD may comprise information about the requested media. Merely as an exemplifying example, the MPD may comprise information such as segment information, e.g. timing information, URL, media characteristics like video resolution and bit rates. The MDP may be organised in different ways such as SegmentList, SegmentTemplate, SegmentBase and SegmentTimeline just to mention a few. Segments may contain any media data.

Depending on the information comprised in the MPD, the media user agent then autonomously requests segment(s) of the media from the media server based on the MPD. In other words, the media user agent is responsible for fetching the media, i.e. segments thereof, and for providing the media to the media user client.

Thus, the media user client in the user terminal is not responsible for fetching the media that the user has requested, instead that functionality is implemented in the media user agent in the node in the communication network.

The method performed by the media user agent in a node in a communication network has several advantages. One possible advantage is that the amount of uplink traffic may be reduced thanks to the media user client not having to request segments of the media, since the media user agent requests (and thus fetches) the segment without any request is transmitted on the uplink between the user terminal and the node in the communication network. Yet another possible advantage is that, since the media user agent is responsible for the fetching of and the providing of segments of media to the media user client, the realisation of network knowledge in media rate adaptation is simplified since the node in the network may easier know and/or obtain information about current network characteristics than the media user client in the user terminal. It is easier for the media user agent as compared to the media user client to collect information from the node to optimise the task of providing the media to the user of the user terminal. In addition a centralised function in the node may boost transfer speed for a given user agent based on local optimisation. This intelligence is difficult to have on the client side since it requires extra signalling of low level attributes and also raises trust issues. Yet a possible advantage is that the solution provides a natural split between the functionality of the media user client and server transport layer connection, which in turn allows for optimised transport solutions for the two significantly different links: the radio link between the user terminal and the node in the communication network, and the transport network link between the node in the communication network and the media server. Still a possible advantage is that a better Quality of Experience, QoE, is achieved in terms of higher average session rate, less number of rate switches, graceful degradation of media rate, which in turn may lead to an increased number of QoE satisfied users in the communication network.

The method may further comprise receiving 160 a number of segments of the media from the media server; and maintaining 165 a data buffer and/or current playback point of the media user client.

By maintaining the data buffer, the received segments may be inserted into the data buffer. The media user agent may also keep track of the current playback point of the media user client. By keeping track of the current playback point of the media user client, the media user agent may know which segments in the data buffer to send to the media user client and also which segments to subsequently request from the media server and when to request those segments of the media. It shall be pointed out that the number of segments is one or more segments.

In this manner, the media user client may be made much simpler and have less "intelligence" or functionality implemented in the media user client. The media may be provided to the media user client in the user terminal depending on current characteristics of the radio link and the transport network link.

In an example, the method further comprises transmitting 170 the segment(s) of the media to the media user client in the user terminal based on information of the user terminal comprised in the received request for media and the status of the data buffer and/or the current playback point of the media user client.

The media user agent may have received information about the user terminal, e.g. in the received request for media. The information about the user terminal may relate to device type e.g. smartphone, or tablet, screen size, brand, playback buffer size. The data transport between the node and the user terminal is designed to convey data transfer from the media user agent to the media user client. Other examples of information that may affect whether, how or when the media user agent transmits the segment(s) to the media user client are indication of play, fast forward and rewind commands, Yet further examples of information that may affect whether, how or when the media user agent transmits the segment(s) to the media user client are Indication of media user client playout buffer, and preferred quality preservation vs playout latency.

The media user agent is responsible for transmitting the segment(s) of the media to the media user client in the user terminal. However, the media user agent does not blindly forwards received segments to the media user client. Different factors may affect how and when the media user agent transmits the segments of the media to the media user client in the user terminal. One example is the information about the user terminal.

The user agent conducts the decision to transmit data for playout to the media user client. The data transmission may be done with a target to keep a given playout buffer level. The target buffer level depends on the number of factors such as e.g. (a) Mobility: High mobility may motivate a larger client buffer because the user terminal may temporarily move out of coverage or get worse channel conditions; (b) Source bitrate variability: Large variance in bitrate within a given rate representation may lead to frequent quality switches; this may be mitigated by a large playout buffer. The decision may be based on the user preference (quality preservation vs playout latency); and (c) Radio Access Network, RAN, congestion level: At low congestion levels it becomes easier to maintain a short media user client playout buffer target level whereas at higher load levels it may be better to target a larger ditto.

The media user agent may further transmit the segments of the media to the media user client in the user terminal based on the status of the data buffer and/or the current playback point of the media user client. The buffer may be relatively full or relatively empty of segments of the media which may affect whether the media user agent transmits one or more of the segments of the media in its data buffer to the media user client in the user terminal. Also, the current playback point of the media user client may play a role. Depending on if the media user client is in the beginning, middle or end of the playout of segments already transmitted to the user media user client, the media user client may more or less urgently need subsequent segments of the media to play out to the user of the user terminal.

Still further, may be for example that the user of the user terminal has paused the playback of the media. Then, since the media user agent keeps track of the current playback point of the media user client, the media user agent may refrain from transmitting any more segments to the media user client until the user activates the playback of media.

The method may still further comprise autonomously requesting 180 additional segment(s) of the media from the media server based on the MPD and segment(s) of the media that previously has been transmitted to the media user client in the user terminal without receiving any request for specific segments from the media user client; and receiving 160 the segment(s) of the media from the media server. The method then further comprises maintaining 165 the data buffer and current playback point of the media user client; and transmitting 170 the segment(s) of the media to the media user client in the user terminal based on the information of the user terminal and the status of the data buffer and the current playback point of the media user client.

Once the media user agent has transmitted at least the first segment(s) of the segments of the media, the media user agent may autonomously request additional segment(s) of the media from the media server. Which segment to autonomously request depends on which segments the media user agent has previously received and/or transmitted to the media user client in the user terminal. Also the MPD is considered when autonomously requesting additional segment(s) of the media from the media server.

The media user client does not send any request for segments to the media user agent, instead the media user agent is responsible for the fetching of segments of the media to the media user client. Consequently, the media user agent autonomously request additional segment(s) of the media from the media server without any "interfering" from the media user client.

Just as described above, the media user agent receives the requested segments of the media, wherein the media user agent may insert the received segments into the data buffer and thus maintaining the data buffer. Also as described above, the media user agent transmits the segment(s) of the media to the media user client in the user terminal based on the information of the user terminal and the status of the data buffer and the current playback point of the media user client.

The autonomously requesting 150, 180 of segment(s) may be based on information related to different media rate representations of the segment(s) of the media, wherein which segment(s) is/are requested depends on the media rate representation(s) of the segment(s) of the media.

The MPD may comprise information relating to segment information, e.g. (but not limited to) timing information, URL, media characteristics like video resolution and bit rates. The media user agent may base the autonomously requesting of segment(s) on information related to different media rate representations of the segment(s).

The media rate representation(s) of the segment(s) of the media comprises for video media e.g. bandwidth, width and height of the video, and segment information such as start and duration of the segment. Based on the adaption algorithm and the available rate representation the media user agent will autonomously require segments. The MPD may describe the given media as a list with different segment sizes in bytes depending on the playout length and the bitrate. One media segment represents a given playout time, the bitrate for the given segment gives the size of the segment. A given playout time may be represented by segments with different bitrates and thus different sizes.

In an example, the transmitting 170 of the segment(s) of the media to the media user client in the user terminal is further based on channel characteristic(s) of a connection between the user terminal and the node in which the media user agent is comprised.

The characteristics of the channel between the user terminal and the node may vary slowly or rapidly. It may depend on the user terminal being somewhat still at the same location or moving around at relatively low or high speed. Also the number of current users in its vicinity may affect the characteristics of the channel between the user terminal and the node. Merely as an example, assume the user terminal is a User Equipment of some sort such as a smartphone or a tablet and the node is a Radio Base Station (RBS) such as an eNodeB, then the UE may move around within the coverage area of the RBS, there may be relatively many other UEs and other neighbouring RBSs in the coverage area of the RBS thereby causing interference, just to illustrate some examples.

Depending on the on channel characteristic(s) of a connection between the user terminal and the node in which the media user agent is comprised, a transmission from the media user agent may be more or less likely to success or fail. Again merely as a simplified and illustrative example, if the channel characteristics are changing and at one point in time are relatively poor, the media user agent may postpone the transmission of the segment(s) of the media to the media user client in the user terminal for a short period of time, hoping that the channel characteristics will soon change for the better. In this manner, resources may be saved in case a transmission would be likely to fail causing a retransmission. Radio transmission in e.g. LTE is generally performed with the objective to at each transmission instant, transmit data to the users, i.e. user terminals, that have the best channel conditions at the given time, this is also known as scheduling, The channel conditions depend on a number of factors such as interference and fading. In order to avoid starvation i.e. some users don't get any data, a fairness mechanism is generally applied in the scheduler. A media user agent may further affect the scheduling decision for instance as a reaction to a low buffer level in the media user client.

The transmitting 170 of the number of segments of the media to the media user client in the user terminal may further be based on the status of the data buffer, the current playback point and the characteristic(s) of the connection between the mobile user agent and the mobile user client.

As described above, the media user agent does not blindly forward received segments to the media user client. Different factors may affect how and when the media user agent transmits the segments of the media to the media user client in the user terminal.

Also as described above, the status of the data buffer may be everything from empty to full, wherein when the data buffer is almost full, the media user agent may transmit the number of segments of the media to the media user client in the user terminal in order to make room for additional segments of media. It may be that the user of the user terminal has paused the playback of the media, wherein the media user agent may refrain from transmitting segments of the media to the media user client in the user terminal.

Further, the connection between the mobile user agent and the mobile user client may be at one point in time temporarily relatively poor, wherein any transmission may be likely to fail. If so, the media user agent may refrain from transmitting segments of the media to the media user client for a relatively short period of time and when the connection between the mobile user agent and the mobile user client improves, the media user client may transmit the number of segments of the media to the media user client in the user terminal.

The characteristics may include congestion level, and mobility of the user terminal in which the media user client is comprised.

There are several examples of the characteristic(s) of the connection between the mobile user agent and the mobile user client. As described above, there may be a relatively large amount of user terminals, wherein there may be a relatively bad interference situation, and/or relatively high congestion level. Congestion level may be for example a resource usage level of radio resources between user terminals and the node, i.e. a measure of the radio resource usage level in the node.

The user of the user terminal may move about and at one point there may be a clear line-of-sight between the user terminal and the node; and at another point in time, there may be one or more obstacles between the user terminal and the node, e.g. a house, a tree, a vehicle and so on. In other words, the mobility of the user terminal may greatly affect the channel conditions of the channel between the user terminal and the node.

The method may yet further comprise performing 145 rate adaptation based on characteristic(s) of a connection between the user terminal and the node in which the media user agent is comprised and based on a connection between the media user agent and the media server, wherein the requesting 150 of segment(s) of the media from the media server is further based on the performed rate adaptation.

The media user agent may overcome relatively poor conditions associated with the connection between the user terminal and the node in which the media user agent is comprised or associated with the connection between the media user agent and the media server by performing rate adaptation.

There are different examples of rate adaptation and they may depend on the media that is transported over the connection. If the connection is relatively poor, the rate adaptation may comprise lowering the amount of bits carrying data related to the media and optionally adding forward error correction bits in order for the receiver to correct some of the possible errors that has occurred due to the relatively poor conditions of the connection. If the connection is of good quality, the rate adaptation may comprise increasing the amount of bits carrying data related to the media as compared to when the connection is relatively poor.

Still further, the method may comprise establishing 110 a first security context with the media user client in the user terminal and a second security context with the media server.

In order for the media user client and media user agent to cooperate in providing media to the user of the user terminal, the media user agent may first establish a first security context with the media user client in the user terminal and a second security context with the media server.

The security relationship/association between media user client and media user agent grants the permission of the media user agent to act on behalf of the media user client. The establishment of the security relationship may use e.g. normal IP Multimedia Sub-system authentication of client and agent. Then the security association from the media user agent to the media server may use the security procedure of e.g. the streaming service that the media user agent is to access. The necessary information to establish the agent—server relationship may be shared by the client information.

The method may yet further comprise selecting 145 a transport layer protocol to be used between the media user client and media user agent and a transport layer protocol to be used between the media user agent and the media server for transmitting 170 the segment(s) of the media to the media user client in the user terminal based on a the characteristics of the connections between the media user client and the media user agent; and between the media user agent and the media server.

Before transmitting the segment(s) of the media to the media user client, the media user agent selects the respective transport layer protocols. As the connection between the media user client and the media server is split into two (due to the intermediate media user agent), it is possible to use different transport layer protocols between the three parties. E.g. if the media user agent is close to a base station serving the user terminal and the characteristics of the connection is known, it is possible to use User Datagram Protocol, UDP, instead of Transport Control Protocol, TCP, as the reliability is handle by layer 2 protocols such as Radio Link Control, RLC, and TCP between the server and agent which is the normal protocol to user between server and client. Thus, the media user agent selects the respective transport layer protocols based on the characteristics of the respective connections.

Once the media user agent has selected the transport layer protocol to be used between the media user client and media user agent and a transport layer protocol to be used between the media user agent and the media server for transmitting the segment(s) of the media to the media user client in the user terminal, the media user agent may transmit segments of the media to the media user client.

The settings for the selected transport layer protocol may be determined based on current characteristics of the connections.

Different characteristics of the respective connections may require different settings for the respective transport layer protocols. For example, initial congestion window, aggressiveness of the congestion control algorithm, the metric choice of what indicates congestion e.g. packet delay variations and/or packet loss, application of forward error correction to the transport layer packets.

In an example, the autonomously requesting 150, 180 of additional segment(s) of the media from the media server and/or the transmitting 170 of the segment(s) of the media to the media user client in the user terminal is further based on commands received from the media user client, the commands being at least one of play, pause, stop, fast forward, and rewind.

The user may give different commands such as e.g. play, pause, stop, fast forward, and rewind. Above is described how a user may pause a playback of media as an example. The user may also or alternatively fast forward and/or rewind the media that is provided to the user by means of the media user client and media user agent. Since the media user agent is responsible for the fetching of segments of media, the media user agent is dependent on such actions taken by the user. Merely as a simplified example, if the user rewinds, the media user agent may need to request previously requested and received segments of media from the media server; of course depending on how much the user wants to rewind the media. In any case, even if the media user agent may not need to request previously requested segments anew, the media user agent may refrain from requesting new subsequent segments of the media until the playback of the media has reached a certain point.

In this manner, both the requesting of 150, 180 of additional segment(s) of the media from the media server and/or the transmitting 170 of the segment(s) of the media to the media user client in the user terminal is dependent on different possible actions taken by the user resulting in commands being received by the media user agent from the media user client.

The node in which the media user agent may be comprised in (i) a base station, (ii) distributed in a Local Service Cloud, LSC, or (iii) a node in a core network part of the communication network.

The node may in an example be comprised in a base station. The base station may be a Radio Base Station (RBS), which sometimes may be referred to as e.g. "eNB", "eNodeB", "NodeB", "B node", Base Transceiver Station (BTS), or Radio Network Controller (RNC) depending on the technology and terminology used.

Alternatively, the node in which the media user agent may be comprised is distributed in an LSC. An LSC may comprise of one or more physical entities which may be directly or indirectly interconnected. The LSC may provide services and/or functionalities to e.g. users of the communication network. Thus the node in which the media user agent may be comprised may be distributed over some or all of the one or more physical entities of the LSC.

In yet an alternative, the node in which the media user agent may be comprised is a node in a core network part of the communication network. The communication network may comprise a Radio Access Network, RAN, and a core network. The core network may comprise different nodes, databases and entities, e.g. switching nodes, subscriber database, Operation, Administration and Maintenance nodes, Operation Support System nodes and gateways. The examples of different nodes, databases and entities are simplified and non-limiting.

Embodiments herein also relate to a method performed by a media user client in a user terminal for providing media to a user of the user terminal, wherein the media user client in the user terminal communicates with a media user agent in a node in a communication network. Exemplifying embodiments of such a method will now be described with reference to FIGS. 2*a*-2*c*.

Figure 2A:
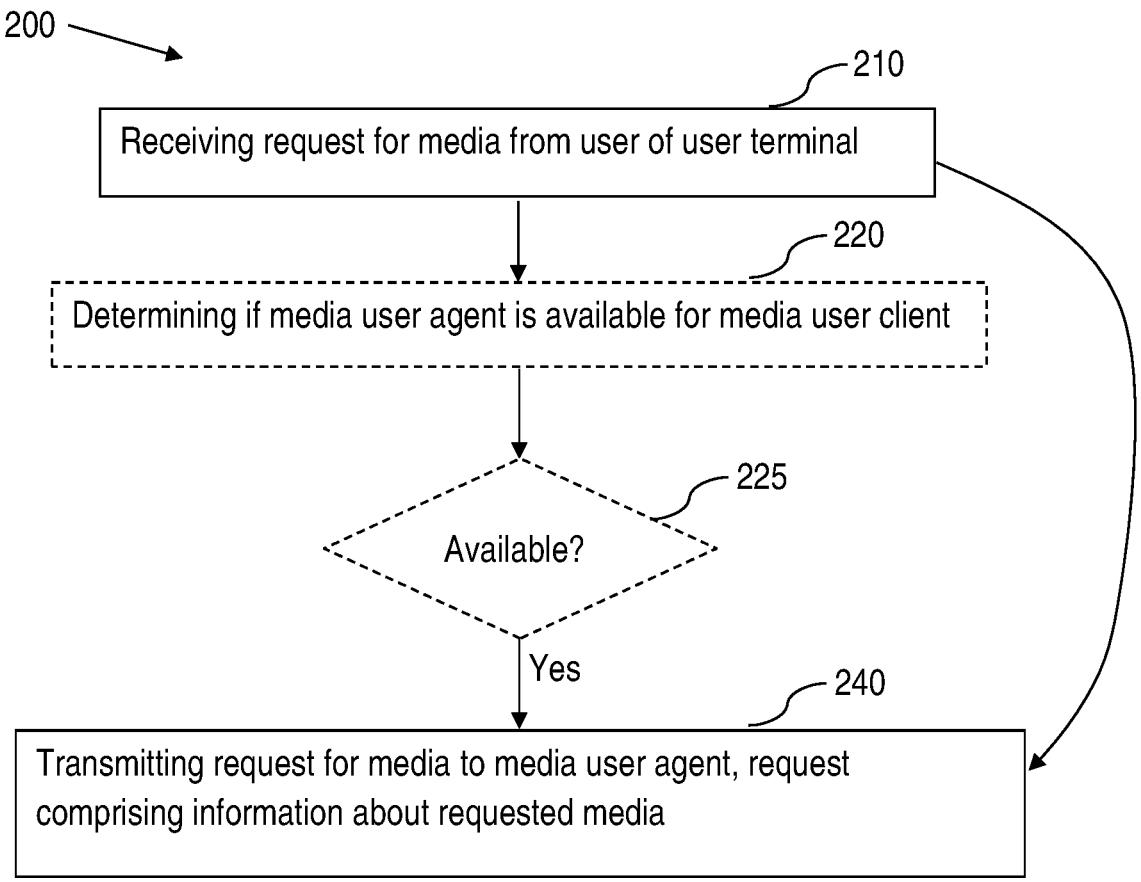
FIG. 2a is a flowchart of a method performed by a media user client in a user terminal for providing media to a user of the user terminal, according to an exemplifying embodiment.

FIG. 2*a* is a flowchart of a method performed by a media user client in a user terminal for providing media to a user of the user terminal, according to an exemplifying embodiment. The media user client in the user terminal communicates with a media user agent in a node in a communication network. FIG. 2*a* illustrates the method 200 comprising receiving 210 a request for a media from a user of the user terminal; and transmitting 240 a request for the media to the media user agent, the request comprising information about the requested media and wherein said request indicates that the media user agent may autonomously request segment(s) of the media from the media server.

When a user of the terminal wishes to be provided by media, for example a video clip, the user requests the media by means of the user client in the user terminal. The media user agent in the node in the communication network cooperates with the media user client in order to retrieve the requested media and present the media to the user on the user terminal. Thus, the media user client receives the request for the media from the user of the user terminal. Merely as an example, the wireless terminal may comprise an APP (short for application) by means of which the user may request the media or any other program, for example a media player. Thus, when the user uses the APP or program to request the media, the media user client receives the request for the media from the user of the user terminal.

Since the media user client is not responsible for fetching segments of the media itself, the media user client transmits the request for the media to the media user agent. It shall be pointed out that the media user agent is not a media server, but instead comprised in an intermediate node between the user terminal and the media server holding the media requested by the user of the user terminal.

The request from the user that is received by the media user client comprises information about the requested media. The media user client also encloses the information about the requested media in the request transmitted to the media user agent. The request also indicates that the media user agent may autonomously request segment(s) of the media from the media server.

The method performed by the media user client in a user terminal for providing media to a user of the user terminal, has several advantages. One possible advantage is that the amount of uplink traffic may be reduced thanks to the media user client not having to request segments of the media, since the media user agent requests (and thus fetches) the segment without any request is transmitted on the uplink between the user terminal and the node in the communication network. Yet another possible advantage is that, since the media user agent is responsible for the fetching of and the providing of segments of media to the media user client, the realisation of network knowledge in media rate adaptation is simplified since the node in the network may easier know and/or obtain information about current network characteristics than the media user client in the user terminal. It is easier for the media user agent as compared to the media user client to collect information from the node to optimise the task of providing the media to the user of the user terminal. In addition a centralised function in the node may boost transfer speed for a given user agent based on local optimisation. This intelligence is difficult to have on the client side since it requires extra signalling of low level attributes and also raises trust issues. Yet a possible advantage is that the solution provides a natural split between the functionality of the media user client and server transport layer connection, which in turn allows for optimised transport solutions for the two significantly different links: the radio link between the user terminal and the node in the communication network, and the transport network link between the node in the communication network and the media server. Still a possible advantage is that a better Quality of Experience, QoE, is achieved in terms of higher average session rate, less number of rate switches, graceful degradation of media rate, which in turn may lead to an increased number of QoE satisfied users in the communication network.

The method may further comprise receiving 250 segments of the media and playing out 260 the media to the user.

The media user client handles, or is responsible for the interface to the user, e.g. an Application Interface, API. The media user client further handles, or is responsible for display and speakers of the user terminal as will be described in more detail below.

Thus, when the media user client receives the segments of the media from the media user agent, the media user client provides the media to the user.

Still further, the method may comprise establishing 230 a first security context with the media user agent.

In order for the media user client and media user agent to cooperate in providing media to the user of the user terminal, the media user client may first establish a first security context with the media user agent in the node of the communication network.

The security relationship/association between media user client and media user agent grants the permission of the media user agent to act on behalf of the media user client. The establishment of the security relationship may use e.g. normal IP Multimedia Sub-system authentication of client and agent.

The media user client and the media user agent may cooperate in establishing the first security context.

In an example, the media user client is responsible for user application interface, display and/or speakers of the user terminal, rendering functionality, playback point and data buffer, without being responsible for data representation selection algorithm, and data fetch functionality from the media server.

The media user client may comprise a data buffer to accommodate received segments of the requested media. Thus, the media user client may insert received segments of the media in the data buffer and then playback the media from the data buffer. When playing back, or playing out, the media, the media user client may make use of e.g. speakers and/or display of the user terminal, wherein the media user client is responsible for user application interface, display and/or speakers of the user terminal. The media user client comprises, or is in connection with, the data buffer such that the media user client may render the media to the user by means of the user application interface (e.g. comprising speakers and/or display of the user terminal). This also means that the media user client is responsible for e.g. keeping track of the playback point.

As described above, the media user client cooperates with the media user agent, wherein the media user agent is responsible for the data representation selection algorithm, and data fetch functionality from the media server. This means that the media user client is not responsible for the data representation selection algorithm, and data fetch functionality from the media server.

The above described solution thus distributes the functionalities of a media client into two parts. The first part resides in the user device, and is referred to as media user client. The second part resides in a network node, and is referred to as media user agent.

The media user client handles: the user application interface, the display and speakers, the media rendering functionality, the playback point, and the play-out (playback) buffer. The media user agent handles: the media rate adaptation algorithm, the media get (fetch) functionality from the media server. It also maintains a data buffer and the current playback point of the corresponding media user client.

This solution may have several embodiments as describe above, for example the media user client may reside in a user terminal such as a User Equipment, UE, for a radio communication system (e.g. Long Term Evolution, LTE) as an APP in an Android or IOS OS based smartphone, while the media user agent may reside in the realisation of an eNB, i.e. radio base station system. Handover may be handled by application state transfer between eNBs. The media user agent may also be realised as an application in LSC. In LSC the user mobility may be handled by the session migration, i.e. one user's media user agent information is migrated to another LSC which handles the cell (coverage area of the eNB) that the UE is handed over to.

The solution provides a natural transport layer split between two significantly different transport links in the user and server path. This split may be used to optimise the transport of the media content between the media server and media user agent, and the media user agent and the media user client respectively. Further, as the media user agent handles media rate adaptation and media get (fetch) functionality it may easily use the radio situation knowledge of the eNB for the link towards the media user client, and at the same time it has knowledge of the link towards the media server and can use this is media rate adaptation and media fetch. The media user agent may also have an improved possibility to control the prioritisation due to an ensured trust relationship with the network node.

Figure 3:
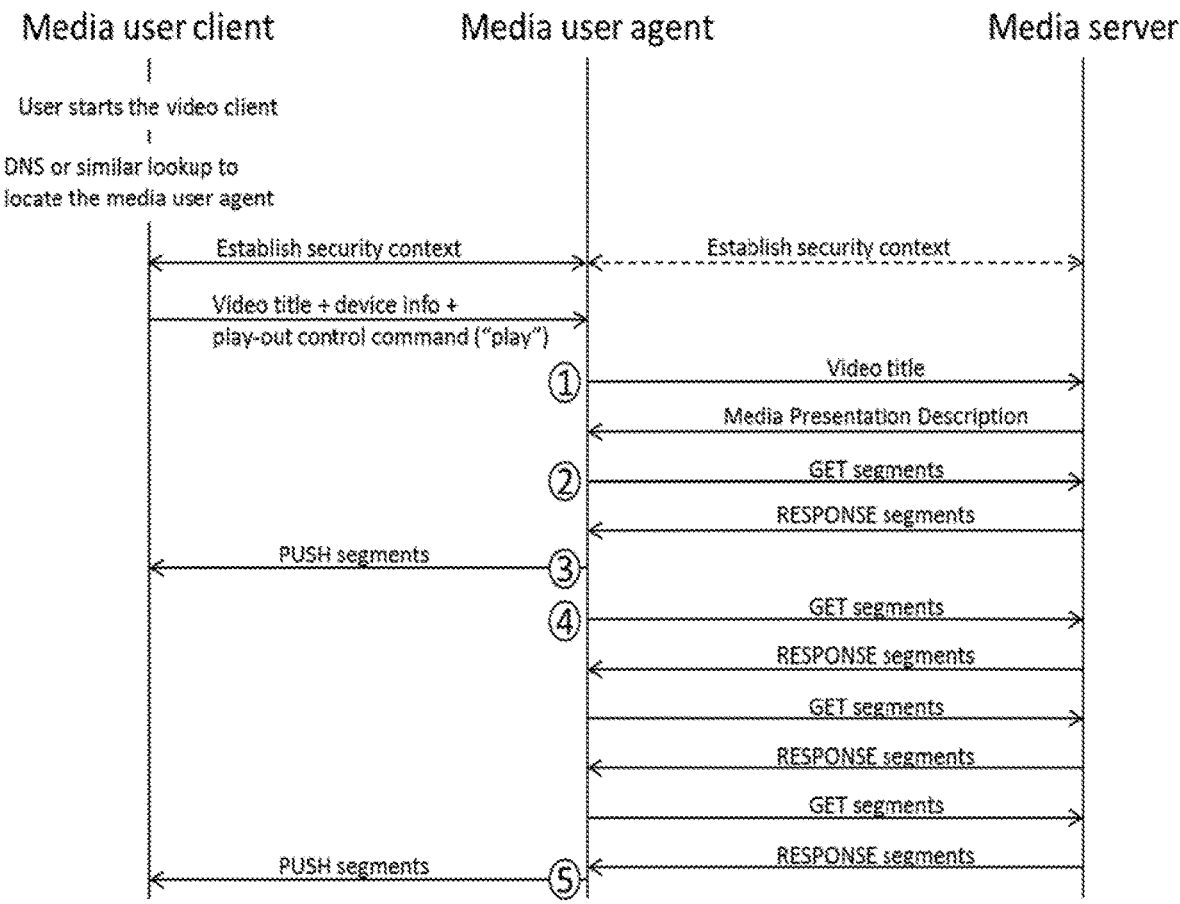
FIG. 3 is a signalling diagram representing a schematic overview of an application media fetch message sequence with DASH video as an example media.

FIG. 3 is a schematic overview of an application media fetch message sequence with DASH video as an example media. The user selects the media (video in this illustrative example) to watch and presses play. The media user agent then handles communication with the video server, similar to normal client server operation. What is worth to note is that the media user client does not have to make any further request for video segments. The media user agent will push down video segments to the media user client's play-out buffer.

With respect to the encircled numbers in FIG. 3, this is the procedure done:
First the media user client locates the media user agent e.g. using Domain name System, DNS, lookup of the pre-configured media user agent name. Then a security relationship/association is setup between media user client and media user agent, which grants the permission of the media user agent to act on behalf of the media user client. The establishment of the security relationship can use e.g. normal IP Multimedia Sub-system authentication of client and agent. Then the security association from the media user agent to the video server uses the security procedure of the streaming service that the media user agent is to access. The necessary information to establish the user agent—server relationship may be shared by the user client.

1. Media user agent request the MPD from the media server
   a. Media user agent gets network information
   b. Media user agent receives the MPD
   c. Media user agent processes the MPD and the received network information
   d. Media user agent decides which segment(s) to fetch/get
2. Media user agent autonomously requests media/video segment(s)
   a. Media user agent receives video segment(s)
   b. Media user agent considers available information
3. Media user agent sends the media/video segment(s) to the media user client
4. Media user agent continues to autonomously request and receive media segment(s)
   a. Media user agent uses received network information, play-out buffer level at the media user client, its own play-out buffer, estimated bandwidth/throughput between itself (media user agent) and the server, and estimated bandwidth/throughput between itself (media user agent) and the media user client in the selection of media segment(s)
5. Media user agent continues to send the segments of the media/video to the media user client.

With respect to 3 above, the media user client receives segments of media/video. The media user client starts the playback when its play-out buffer is at a given level. The media user client monitors the user application interface for playback control command input from the user. If the user makes an input the media user client will take the appropriate action, e.g. pause, fast forward, rewind, it also will send the playback control command to its media user agent. The media user agent may take appropriate action based on the playback control command. Please note that even though the user has paused the media the media user agent may continue requesting video segments from the server, however, it may hold the push of video segment(s) to the media user client.

In a further embodiment the media user agent may fetch more than one bitrate representation. This makes it possible to e.g. quickly switch to a lower bitrate representation in case the throughput drops quickly. The use of this option may be dependent on the congestion level along the path between the user agent and the media/video server.

The data transport between the eNB and the UE may be designed to convey:
  Data transfer from user agent to user client.
  Indication of play, fast forward and rewind commands.
  Indication of user client playout buffer to the user agent.
  Preferred quality preservation vs playout latency. For instance in live streaming events like football, ice-hockey or cross-country skiing the end user may prefer a low latency in order to be part of the event even though it may occasionally mean lower resolution video.
An exemplifying protocol for conveying this information is Websockets over a lower layer protocol such as TCP The user agent conducts the decision to transmit data for playout to the user client. The data transmission is done with a target to keep a given playout buffer level. The target buffer level depends on the number of factors such as:
  Mobility: High mobility may motivate a larger client buffer because the UE may temporarily move out of coverage or get worse channel conditions.
  Source bitrate variability: Large variance in bitrate within a given rate representation may lead to frequent quality switches; this can be mitigated by a large playout buffer. The decision is based on the user preference (quality preservation vs playout latency).
  RAN congestion level: At low congestion levels it becomes easier to maintain a short client playout buffer target level whereas at higher load levels it may be better to target a larger ditto to reduce the risk for buffer underrun and freezed video.

If the media user client cannot establish a connection to the media user agent or the media user agent refuses the connection establishment the media user client may use the built in functionality for media representation selection and fetch functionality. The built in functionality may correspond to the functionality of the media user agent.

The media user client may also select the use of the media user agent based on which access network it is currently connected to. An example of a rule to base the selection on is if it non-operator controlled access, e.g. home Wi-Fi, do not use the media user agent, and else use media user agent. The location of the media user agent may be done in several ways, e.g. by pre-configuration, DNS lookup of pre-configured media user agent name.

Embodiments herein also relate to a media user agent operable in a communication network for providing media from a media server to a media user client in a user terminal. The media user agent has the same technical features, objects and advantages as the method performed by the media user agent. The media user agent will only be described in brief in order to avoid unnecessary repetition.

The media user agent will be described with reference to FIGS. 4 and 5. Both FIG. 4 and FIG. 5 are block diagram of embodiments of the media user agent for providing media from a media server to a media user client in a user terminal.

Figure 4:
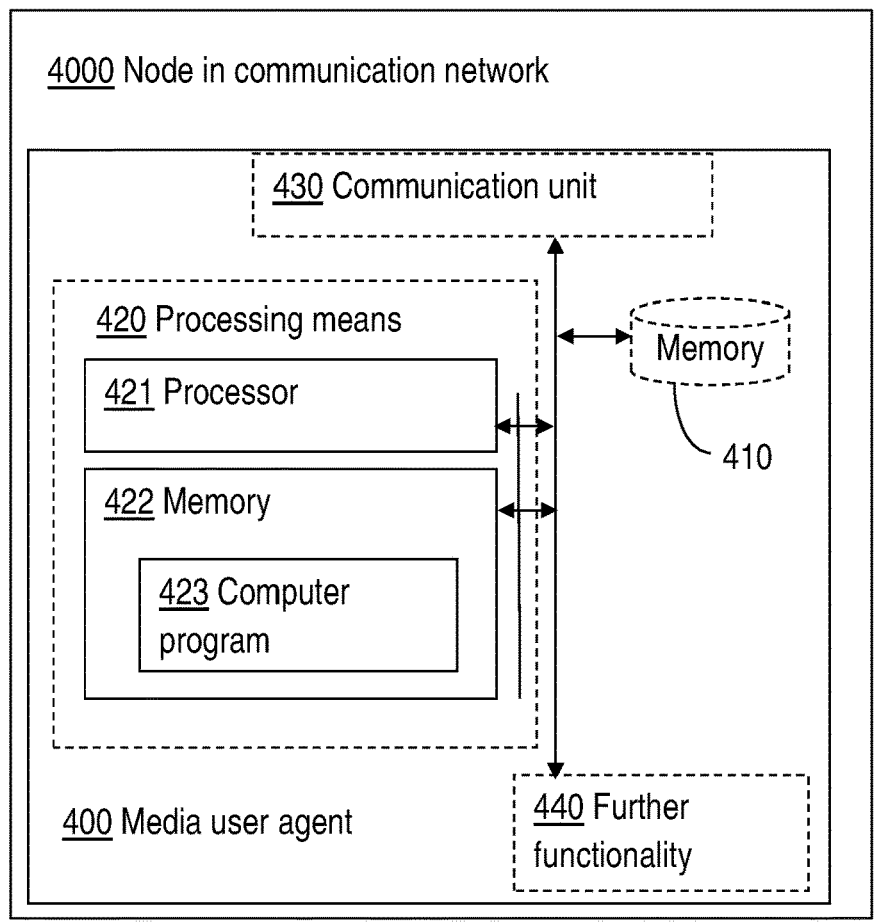
FIG. 4 is a block diagram of a media user agent in a node in a communication network for providing media from a media server to the media user client in a user terminal, according to an exemplifying embodiment.
Figure 5:
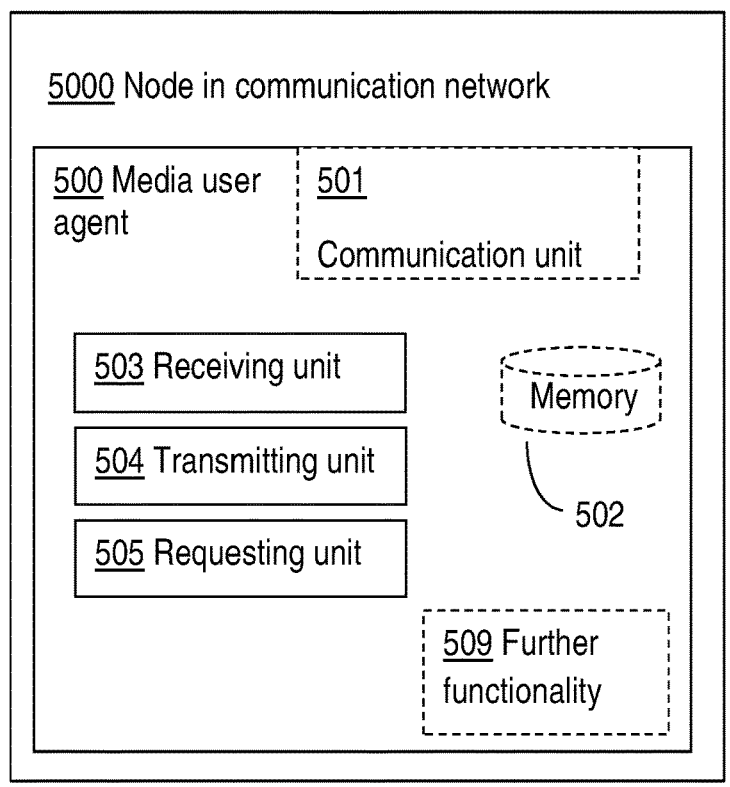
FIG. 5 is a block diagram of a media user agent in a node in a communication network for providing media from a media server to the media user client in a user terminal, according to another exemplifying embodiment.

FIGS. 4 and 5 illustrate the media user agent 400, 500 being configured for receiving a request for media from the media user client, the request for media comprising information about the requested media; and transmitting a request of the media to a media server, the request comprising the information about the requested media. The media user agent 400, 500 is further configured for receiving an MPD from the media server; and autonomously requesting segment(s) of the media from the media server based on the MPD.

The media user agent 400, 500 may be realised or implemented in various different ways. A first exemplifying implementation or realisation is illustrated in FIG. 4. FIG. 4 illustrates the media user agent 400 comprising a processor 421 and memory 422, the memory comprising instructions, e.g. by means of a computer program 423, which when executed by the processor 421 causes the media user agent 400 to receive a request for media from the media user client, the request for media comprising information about the requested media; and to transmit a request of the media to a media server, the request comprising the information about the requested media. The memory further comprises instructions, which when executed by the processor 421 causes the media user agent 400 to receive an MPD from the media server; and to autonomously request segment(s) of the media from the media server based on the MPD.

FIG. 5 also illustrates the media user agent 400 comprising a memory 410. It shall be pointed out that FIG. 4 is merely an exemplifying illustration and memory 410 may be optional, be a part of the memory 422 or be a further memory of the media user agent 400. The memory may for example comprise information relating to the media user agent 400, to statistics of operation of the media user agent 400, just to give a couple of illustrating examples. FIG. 4 further illustrates the media user agent 400 comprising processing means 420, which comprises the memory 422 and the processor 421. Still further, FIG. 4 illustrates the media user agent 400 comprising a communication unit 430. The communication unit 430 may comprise an interface through which the media user agent 400 communicates with other nodes or entities of the communication network as well as other communication units. FIG. 4 also illustrates the media user agent 400 comprising further functionality 440. The further functionality 440 may comprise hardware of software necessary for the media user agent 400 to perform different tasks that are not disclosed herein.

An alternative exemplifying implementation of the media user agent 400, 500 is illustrated in FIG. 5. FIG. 5 illustrates the media user agent 500 comprising a receiving unit 503 for receiving a request for media from the media user client, the request for media comprising information about the requested media; and a transmitting unit 504 for transmitting a request of the media to a media server, the request comprising the information about the requested media. The receiving unit 503 is also for receiving an MPD from the media server. The media user agent 500 also comprises a requesting unit 505 for autonomously requesting segment(s) of the media from the media server based on the MPD.

In FIG. 5, the media user agent 500 is also illustrated comprising a communication unit 501. Through this unit, the media user agent 500 is adapted to communicate with other nodes and/or entities in the communication network. The communication unit 501 may comprise more than one receiving arrangement. For example, the communication unit 501 may be connected to both a wire and an antenna, by means of which the media user agent 500 is enabled to communicate with other nodes and/or entities in the communication network. Similarly, the communication unit 501 may comprise more than one transmitting arrangement, which in turn is connected to both a wire and an antenna, by means of which the media user agent 500 is enabled to communicate with other nodes and/or entities in the communication network. The media user agent 500 is further illustrated comprising a memory 502 for storing data. Further, the media user agent 500 may comprise a control or processing unit (not shown) which in turn is connected to the different units 503-505. It shall be pointed out that this is merely an illustrative example and the media user agent 500 may comprise more, less or other units or modules which execute the functions of the media user agent 500 in the same manner as the units illustrated in FIG. 5.

It should be noted that FIG. 5 merely illustrates various functional units in the media user agent 500 in a logical sense. The functions in practice may be implemented using any suitable software and hardware means/circuits etc. Thus, the embodiments are generally not limited to the shown structures of the media user agent 500 and the functional units. Hence, the previously described exemplary embodiments may be realised in many ways. For example, one embodiment includes a computer-readable medium having instructions stored thereon that are executable by the control or processing unit for executing the method steps in the media user agent 500. The instructions executable by the computing system and stored on the computer-readable medium perform the method steps of the media user agent 500 as set forth in the claims.

The media user agent 400, 500 has the same possible advantages as the method performed by the media user agent. One possible advantage is that the amount of uplink traffic may be reduced thanks to the media user client not having to request segments of the media, since the media user agent requests (and thus fetches) the segment without any request is transmitted on the uplink between the user terminal and the node in the communication network. Yet another possible advantage is that, since the media user agent is responsible for the fetching of and the providing of segments of media to the media user client, the realisation of network knowledge in media rate adaptation is simplified since the node in the network may easier know and/or obtain information about current network characteristics than the media user client in the user terminal. It is easier for the media user agent as compared to the media user client to collect information from the node to optimise the task of providing the media to the user of the user terminal. In addition a centralised function in the node may boost transfer speed for a given user agent based on local optimisation. This intelligence is difficult to have on the client side since it requires extra signalling of low level attributes and also raises trust issues. Yet a possible advantage is that the solution provides a natural split between the functionality of the media user client and server transport layer connection, which in turn allows for optimised transport solutions for the two significantly different links: the radio link between the user terminal and the node in the communication network, and the transport network link between the node in the communication network and the media server. Still a possible advantage is that a better QoE is achieved in terms of higher average session rate, less number of rate switches, graceful degradation of media rate, which in turn may lead to an increased number of QoE satisfied users in the communication network.

According to an embodiment, the media user agent 400, 500 further is configured for receiving a number of segments of the media from the media server; and maintaining a data buffer and/or current playback point of the media user client.

According to yet an embodiment, the media user agent 400, 500 further is configured for transmitting the segment(s) of the media to the media user client in the user terminal based on information of the user terminal comprised in the received request for media and the status of the data buffer and/or the current playback point of the media user client.

According to still an embodiment, the media user agent 400, 500 further is configured for autonomously requesting additional segment(s) of the media from the media server based on the MPD and segment(s) of the media that previously has been transmitted to the media user client in the user terminal without receiving any request for specific segments from the media user client; receiving the segment(s) of the media from the media server; maintaining the data buffer and current playback point of the media user client; and transmitting the segment(s) of the media to the media user client in the user terminal based on the information of the user terminal and the status of the data buffer and the current playback point of the media user client.

According to a further embodiment, the media user agent 400, 500 is configured for autonomously requesting segment(s) based on information related to different media rate representations of the segment(s) of the media, wherein which segment(s) is/are requested depends on the media rate representation(s) of the segment(s) of the media.

According to another embodiment, the transmitting of the segment(s) of the media to the media user client in the user terminal is further based on channel characteristic(s) of a connection between the user terminal and the node in which the media user agent is comprised.

According to an embodiment, the transmitting of the number of segments of the media to the media user client in the user terminal is based on the status of the data buffer, the current playback point and the characteristic(s) of the connection between the mobile user agent and the mobile user client.

According to yet an embodiment, the characteristics includes congestion level, and mobility of the user terminal in which the media user client is comprised.

According to a further embodiment, the media user agent 400, 500 is configured for performing rate adaptation based on characteristic(s) of a connection between the user terminal and the node in which the media user agent is comprised and based on a connection between the media user agent and the media server, wherein the requesting of segment(s) of the media from the media server is further based on the performed rate adaptation.

According to still an embodiment, the media user agent 400, 500 is configured for establishing a first security context with the media user client in the user terminal and a second security context with the media server.

According to yet another embodiment, the media user agent 400, 500 is configured for selecting a transport layer protocol to be used between the media user client and media user agent and a transport layer protocol to be used between the media user agent and the media server for transmitting the segment(s) of the media to the media user client in the user terminal based on a the characteristics of the connections between the media user client and the media user agent; and between the media user agent and the media server.

According to a further embodiment, settings for the selected transport layer protocol are determined based on current characteristics of the connections.

According to another embodiment, the autonomously requesting of additional segment(s) of the media from the media server and/or the transmitting of the segment(s) of the media to the media user client in the user terminal is further based on commands received from the media user client, the commands being at least one of play, pause, stop, fast forward, and rewind.

According to yet an embodiment, the node in which the media user agent is comprised is (i) a base station, (ii) distributed in a Local Service Cloud, LSC, or (iii) a node in a core network part of the communication network.

According to an embodiment, the media user agent 400, 500 is a node 4000, 5000 in the communication system, or is comprised in the node 4000, 5000 in the communication system. By this embodiment, a node 4000, 5000 operable in a communication network for providing media from a media server to a media user client in a user terminal is provided. The node 4000, 5000 is configured for receiving a request for media from the media user client, the request for media comprising information about the requested media; and transmitting a request of the media to a media server, the request comprising the information about the requested media. The node 4000, 5000 is further configured for receiving an MPD from the media server; and autonomously requesting segment(s) of the media from the media server based on the MPD.

Embodiments herein also relate to a media user client operable in a communication network for providing media to a user of a user terminal, wherein the media user client communicates with a media user agent in a node in the communication network. The media user agent has the same technical features, objects and advantages as the method performed by the media user client. The media user client will only be described in brief in order to avoid unnecessary repetition.

The media user client will be described with reference to FIGS. 6 and 7. Both FIG. 6 and FIG. 7 are block diagram of embodiments of the media user client operable in the communication network for providing media to a user of the user terminal.

Figure 6:
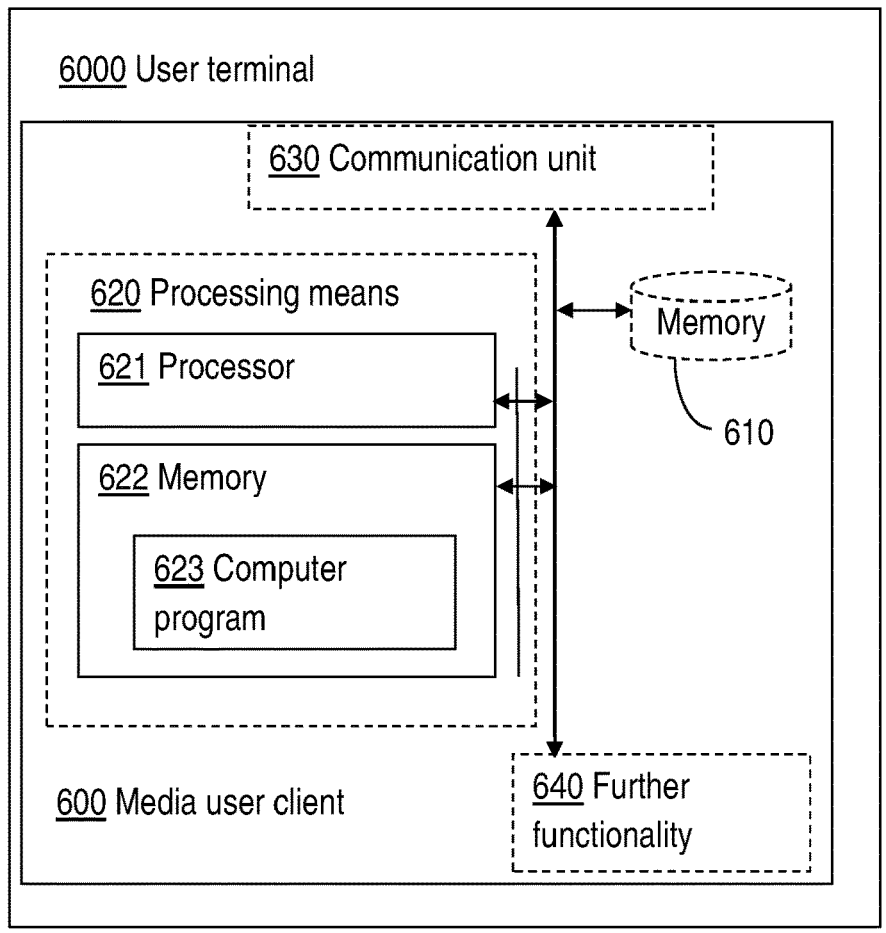
FIG. 6 is a block diagram of a media user client in a user terminal for providing media to a user of the user terminal, according to an exemplifying embodiment.
Figure 7:
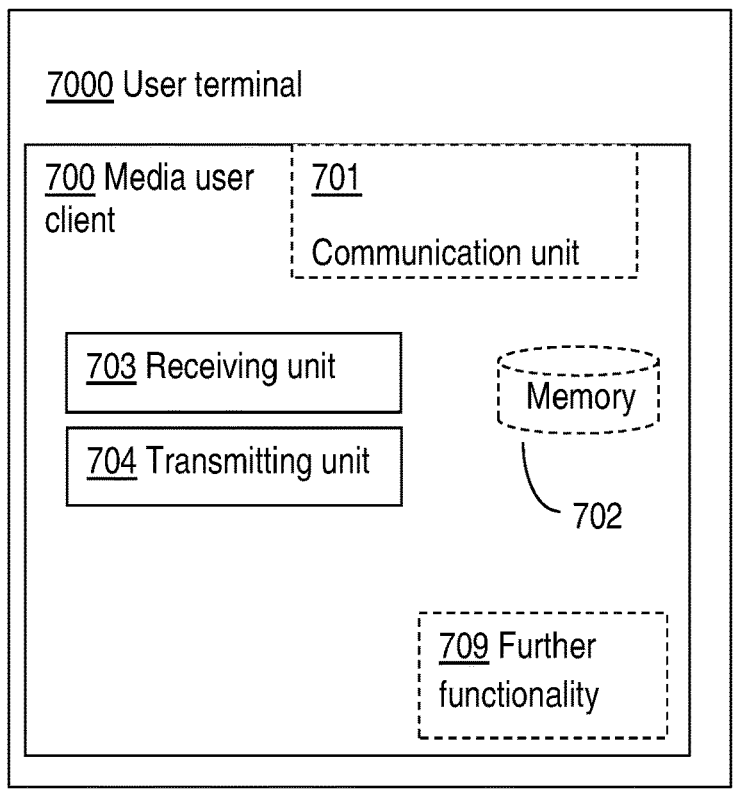
FIG. 7 is a block diagram of a media user client in a user terminal for providing media to a user of the user terminal, according to another exemplifying embodiment.

FIGS. 6 and 7 illustrate the media user client 600, 700 being configured for receiving a request for a media from a user of the user terminal; and transmitting a request for the media to the media user agent, the request comprising information about the requested media and wherein said request indicates that the media user agent may autonomously request segment(s) of the media from the media server.

The media user agent 600, 700 may be realised or implemented in various different ways. A first exemplifying implementation or realisation is illustrated in FIG. 6. FIG. 6 illustrates the media user client 600 comprising a processor 621 and memory 622, the memory comprising instructions, e.g. by means of a computer program 623, which when executed by the processor 621 causes the media user client 600 to receive a request for a media from a user of the user terminal; and to transmit a request for the media to the media user agent, the request comprising information about the requested media and wherein said request indicates that the media user agent may autonomously request segment(s) of the media from the media server.

An alternative exemplifying implementation of the media user client 600, 700 is illustrated in FIG. 7. FIG. 7 illustrates the media user client 700 comprising a receiving unit 703 for receiving a request for a media from a user of the user terminal; and a transmitting unit 704 for transmitting a request for the media to the media user agent, the request comprising information about the requested media and wherein said request indicates that the media user agent may autonomously request segment(s) of the media from the media server.

In FIG. 7, the media user client 700 is also illustrated comprising a communication unit 701. Through this unit, the media user client 700 is adapted to communicate with other nodes and/or entities in the communication network. The communication unit 701 may comprise more than one receiving arrangement. For example, the communication unit 701 may be connected to both a wire and an antenna, by means of which the media user client 700 is enabled to communicate with other nodes and/or entities in the communication network. Similarly, the communication unit 701 may comprise more than one transmitting arrangement, which in turn is connected to both a wire and an antenna, by means of which the media user client 700 is enabled to communicate with other nodes and/or entities in the communication network. The media user client 700 is further illustrated comprising a memory 702 for storing data. Further, the media user client 700 may comprise a control or processing unit (not shown) which in turn is connected to the different units 703-704. It shall be pointed out that this is merely an illustrative example and the media user client 700 may comprise more, less or other units or modules which execute the functions of the media user client 700 in the same manner as the units illustrated in FIG. 7.

It should be noted that FIG. 7 merely illustrates various functional units in the media user client 700 in a logical sense. The functions in practice may be implemented using any suitable software and hardware means/circuits etc. Thus, the embodiments are generally not limited to the shown structures of the media user client 700 and the functional units. Hence, the previously described exemplary embodiments may be realised in many ways. For example, one embodiment includes a computer-readable medium having instructions stored thereon that are executable by the control or processing unit for executing the method steps in the media user client 700. The instructions executable by the computing system and stored on the computer-readable medium perform the method steps of the media user client 700 as set forth in the claims.

The media user client 600, 700 has the same possible advantages as the method performed by the media user client. One possible advantage is that the amount of uplink traffic may be reduced thanks to the media user client not having to request segments of the media. Still a possible advantage is that, since the media user agent is responsible for the fetching of and the providing of segments of media to the media user client, the realisation of network knowledge in media rate adaptation is simplified since the node in the network may easier know and/or obtain information about current network characteristics than the media user client in the user terminal. Yet a possible advantage is that it provides a natural split between the functionality of the media user client and server transport layer connection, which in turn allows for optimised transport solutions for the two significantly different links: the radio link between the user terminal and the node in the communication network, and the transport network link between the node in the communication network and the media server. Still a possible advantage is that a better Quality of Experience, QoE, is achieved in terms of higher average session rate, less number of rate switches, graceful degradation of media rate, which in turn may lead to an increased number of QoE satisfied users in the communication network.

According to an embodiment, the media user client 600, 700 further is configured for receiving segments of the media and playing out the media to the user.

According to yet an embodiment, the media user client 600, 700 is further configured for establishing a first security context with the media user agent.

According to yet an embodiment, the media user client is responsible for user application interface, display and/or speakers of the user terminal, rendering functionality, playback point and data buffer, without being responsible for data representation selection algorithm, and data fetch functionality from the media server.

Figure 8:
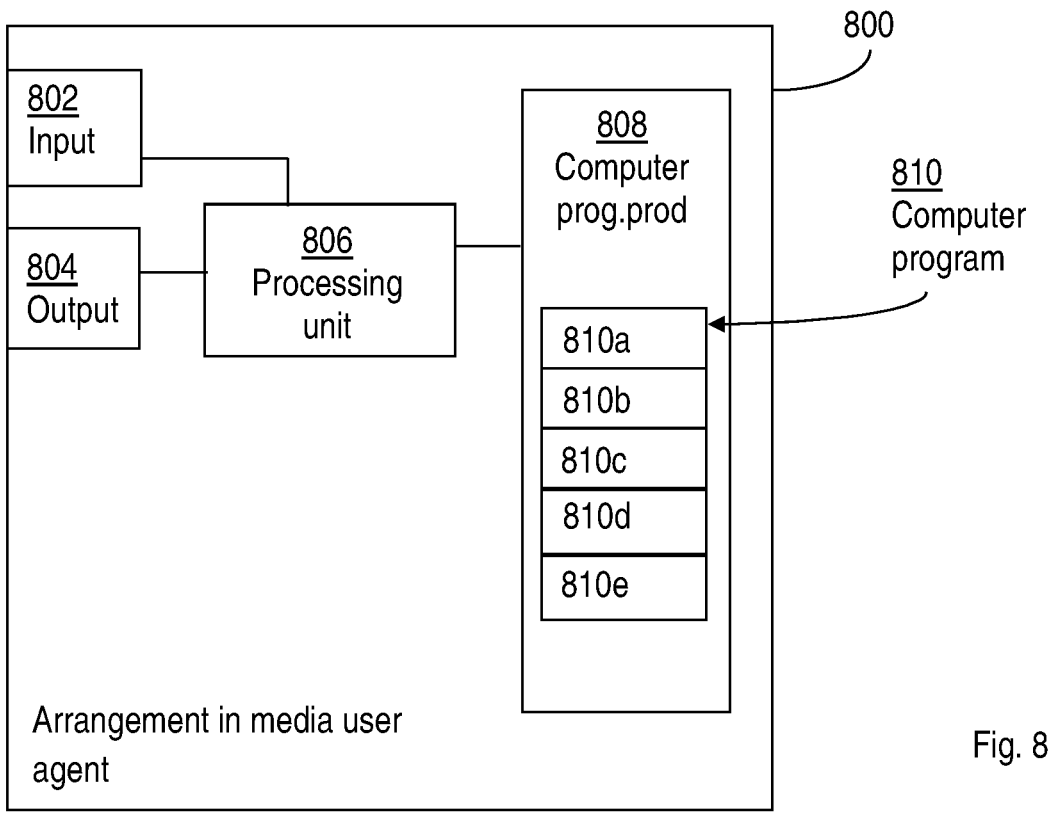
FIG. 8 is a block diagram of an arrangement in a media user agent in a node in a communication network for providing media from a media server to the media user client in a user terminal, according to an exemplifying embodiment.

According to an embodiment, the media user client 600, 700 is a user terminal 6000, 7000 or is comprised in the user terminal 6000, 7000. By this embodiment, a user terminal 6000, 7000 operable in a communication network for providing media to a user of a user terminal is provided. The user terminal 6000, 7000 communicates with a media user agent in a node in the communication network. The user terminal 6000, 7000 is configured for receiving a request for a media from a user of the user terminal; and transmitting a request for the media to the media user agent, the request comprising information about the requested media and wherein said request indicates that the media user agent may autonomously request segment(s) of the media from the media server FIG. 8 schematically shows an embodiment of an arrangement 800 in a media user agent 500. Comprised in the arrangement 800 in the media user agent 500 are here a processing unit 806, e.g. with a Digital Signal Processor, DSP. The processing unit 806 may be a single unit or a plurality of units to perform different actions of procedures described herein. The arrangement 800 of the media user agent 500 may also comprise an input unit 802 for receiving signals from other entities, and an output unit 804 for providing signal(s) to other entities. The input unit and the output unit may be arranged as an integrated entity or as illustrated in the example of FIG. 5, as one or more interfaces 501.

Furthermore, the arrangement 800 in the media user agent 500 comprises at least one computer program product 808 in the form of a non-volatile memory, e.g. an Electrically Erasable Programmable Read-Only Memory, EEPROM, a flash memory and a hard drive. The computer program product 808 comprises a computer program 810, which comprises code means, which when executed in the processing unit 806 in the arrangement 800 in the media user agent 500 causes the media user agent 500 to perform the actions e.g. of the procedure described earlier in conjunction with FIGS. 1*a*-1*e*.

The computer program 810 may be configured as a computer program code structured in computer program modules 810*a*-810*e*. Hence, in an exemplifying embodiment, the code means in the computer program of the arrangement 800 in the media user agent 500 comprises a receiving unit, or module, for receiving a request for media from the media user client, the request for media comprising information about the requested media; and a transmitting unit, or module, for transmitting a request of the media to a media server, the request comprising the information about the requested media. The receiving unit, or module, is also for receiving an MPD from the media server. The computer program further comprises a requesting unit, or module, for autonomously requesting segment(s) of the media from the media server based on the MPD.

The computer program modules could essentially perform the actions of the flow illustrated in FIGS. 1a-1e, to emulate the media user agent 500. In other words, when the different computer program modules are executed in the processing unit 806, they may correspond to the units 503-505 of FIG. 5.

Figure 9:
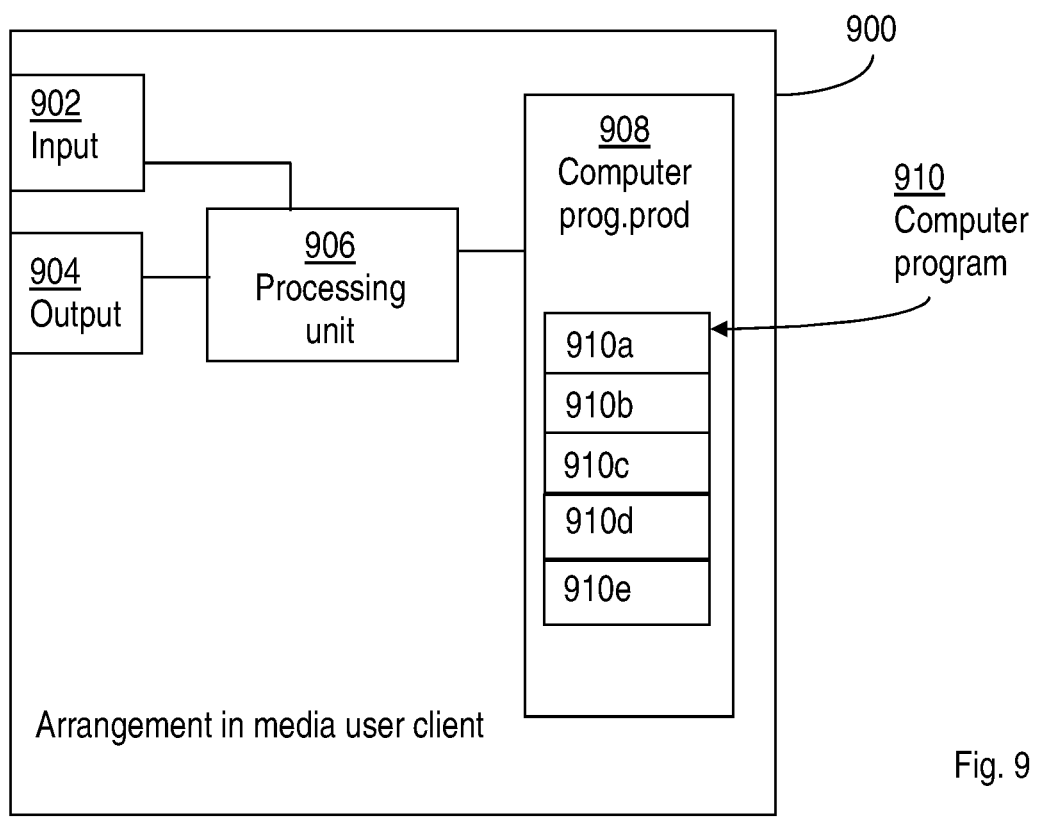
FIG. 9 is a block diagram of an arrangement in a media user client in a user terminal for providing media to a user of the user terminal, according to an exemplifying embodiment.

FIG. 9 schematically shows an embodiment of an arrangement 900 in a media user client 700. Comprised in the arrangement 900 in the media user client 700 are here a processing unit 906, e.g. with DSP. The processing unit 906 may be a single unit or a plurality of units to perform different actions of procedures described herein. The arrangement 900 of the media user client 700 may also comprise an input unit 902 for receiving signals from other entities, and an output unit 904 for providing signal(s) to other entities. The input unit and the output unit may be arranged as an integrated entity or as illustrated in the example of FIG. 7, as one or more interfaces 701.

Furthermore, the arrangement 900 in the media user client 700 comprises at least one computer program product 908 in the form of a non-volatile memory, e.g. an EEPROM, a flash memory and a hard drive. The computer program product 908 comprises a computer program 910, which comprises code means, which when executed in the processing unit 906 in the arrangement 900 in the media user client 700 causes the media user client 700 to perform the actions e.g. of the procedure described earlier in conjunction with FIGS. 2a-2c.

The computer program 910 may be configured as a computer program code structured in computer program modules 910a-910e. Hence, in an exemplifying embodiment, the code means in the computer program of the arrangement 900 in the media user client 700 comprises a receiving unit, or module, for receiving a request for a media from a user of the user terminal. The computer program further comprises a transmitting unit, or module, for transmitting a request for the media to the media user agent, the request comprising information about the requested media and wherein said request indicates that the media user agent may autonomously request segment(s) of the media from the media server.

Figure 2B:
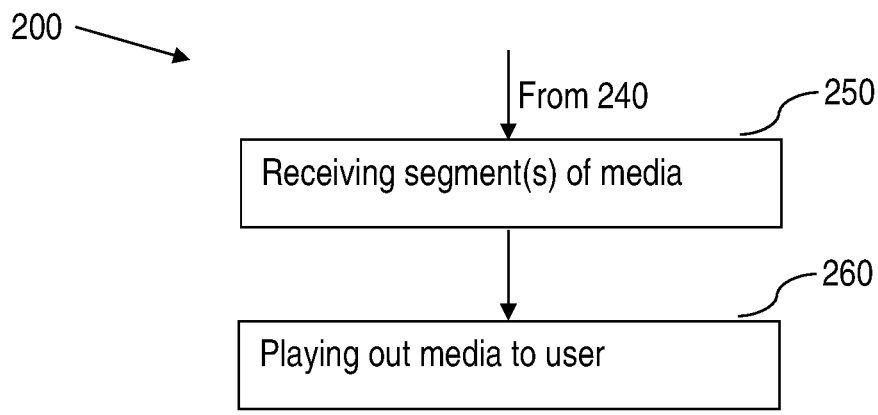
FIG. 2b is a flowchart of a method performed by a media user client in a user terminal for providing media to a user of the user terminal, according to yet an exemplifying embodiment.
Figure 2C:
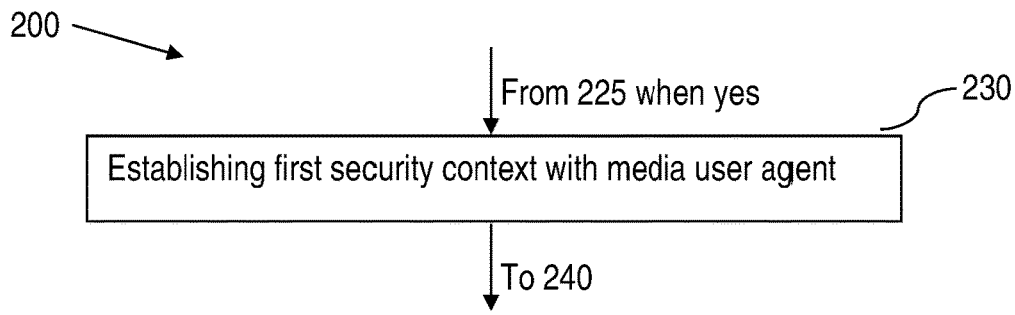
FIG. 2c is a flowchart of a method performed by a media user client in a user terminal for providing media to a user of the user terminal, according to still an exemplifying embodiment.

The computer program modules could essentially perform the actions of the flow illustrated in FIGS. 2a-2c, to emulate the media user client 700. In other words, when the different computer program modules are executed in the processing unit 906, they may correspond to the units 703-704 of FIG. 7.

Although the code means in the embodiments disclosed above in conjunction with FIGS. 5 and 7 are implemented as computer program modules which when executed in the respective processing unit causes the media user agent and the media user client to perform the actions described above in the conjunction with figures mentioned above, at least one of the code means may in alternative embodiments be implemented at least partly as hardware circuits.

The processor may be a single Central Processing Unit, CPU, but could also comprise two or more processing units. For example, the processor may include general purpose microprocessors; instruction set processors and/or related chips sets and/or special purpose microprocessors such as Application Specific Integrated Circuits, ASICs. The processor may also comprise board memory for caching purposes. The computer program may be carried by a computer program product connected to the processor. The computer program product may comprise a computer readable medium on which the computer program is stored. For example, the computer program product may be a flash memory, a Random-Access Memory RAM, Read-Only Memory, ROM, or an EEPROM, and the computer program modules described above could in alternative embodiments be distributed on different computer program products in the form of memories within the media user agent and the media user client respectively.

It is to be understood that the choice of interacting units, as well as the naming of the units within this disclosure are only for exemplifying purpose, and nodes suitable to execute any of the methods described above may be configured in a plurality of alternative ways in order to be able to execute the suggested procedure actions.

It should also be noted that the units described in this disclosure are to be regarded as logical entities and not with necessity as separate physical entities.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

The invention claimed is:

1. A method performed by a media user agent in a node in a communication network, for providing media from a media server to a media user client in a user terminal, the method comprising:
    receiving a request for the media from the media user client, the request for the media comprising information about the requested media,
    transmitting the request for the media to the media server, the request comprising the information about the requested media,
    receiving a Media Presentation Description (MPD) from the media server,
    autonomously requesting segment(s) of the media from the media server based on the MPD,
    receiving a number of the segment(s) of the media from the media server,
    maintaining a data buffer and a current playback point of the media user client, and
    transmitting the segment(s) of the media to the media user client in the user terminal based on the current playback point of the media user client and a playout buffer level of the media user client, wherein the playout buffer level depends on mobility of the user terminal, source bitrate variability, and Radio Access Network (RAN) congestion level.

2. The method according to claim 1, wherein the transmitting of the segment(s) of the media to the media user client in the user terminal is further based on: information of the user terminal comprised in the received request for the media and status of the data buffer.

3. The method according to claim 2, further comprising:
    autonomously requesting additional segment(s) of the media from the media server, based on the MPD and the segment(s) of the media that has been previously transmitted to the media user client in the user terminal, without receiving any request for specific segments from the media user client,
    receiving the additional segment(s) of the media from the media server,
    maintaining the data buffer and the current playback point of the media user client, and
    transmitting the additional segment(s) of the media to the media user client in the user terminal based on: the information of the user terminal, the status of the data buffer, and the current playback point of the media user client.

4. The method according to claim 3, wherein the autonomously requesting of the additional segment(s) of the media from the media server and/or the transmitting of the additional segment(s) of the media to the media user client in the user terminal is further based on commands received from the media user client, the commands being at least one of: play, pause, stop, fast forward, and rewind.

5. The method according to claim 1, wherein the autonomously requesting of the segment(s) is based on information related to different media rate representations of the segment(s) of the media, and wherein which of the segment(s) is/are requested depends on the different media rate representations of the segment(s) of the media.

6. The method according to claim 1, wherein the transmitting of the segment(s) of the media to the media user client in the user terminal is further based on channel characteristic(s) of a connection between the user terminal and the node in which the media user agent is comprised.

7. The method according to claim 6, wherein the transmitting of the segment(s) of the media to the media user client in the user terminal is further based on: status of the data buffer, the current playback point, and the channel characteristic(s) of the connection between the node in which the media user agent is comprised and the media user client in the user terminal.

8. The method according to claim 7, wherein the channel characteristic(s) includes congestion level and the mobility of the user terminal in which the media user client is comprised.

9. The method according to claim 1, further comprising performing rate adaption based on channel characteristic(s) of a connection between the user terminal and the node in which the media user agent is comprised, and based on a connection between the media user agent and the media server, wherein the autonomously requesting of the segment(s) of the media from the media server is further based on the performed rate adaptation.

10. The method according to claim 1, further comprising establishing a first security context with the media user client in the user terminal and a second security context with the media server.

11. The method according to claim 1, further comprising selecting a transport layer protocol to be used between the media user client and the media user agent and a transport layer protocol to be used between the media user agent and the media server for transmitting the segment(s) of the media to the media user client in the user terminal based on channel characteristic(s) of connections between the media user client and the media user agent and between the media user agent and the media server.

12. The method according to claim 11, wherein settings for the selected transport layer protocol are determined based on current characteristics of the connections.

13. The method according to claim 1, wherein the node in which the media user agent is comprised is: (i) a base station, (ii) distributed in a Local Service Cloud (LSC), or (iii) a node in a core network part of the communication network.

14. A method performed by a media user client in a user terminal, for providing media to a user of the user terminal, wherein the media user client in the user terminal communicates with a media user agent in a node in a communication network, the method comprising:
receiving a request for the media from the user of the user terminal,
transmitting the request for the media to the media user agent, the request comprising information about the requested media, wherein said request indicates that the media user agent autonomously requests segment(s) of the media from a media server based on a Media Presentation Description (MPD) received from the media server, and wherein the information included in said request comprises an indication of a playout buffer level of the media user client, and
receiving the segment(s) of the media from the media user agent based on a current playback point of the media user client and the playout buffer level of the media user client, wherein the playout buffer level depends on mobility of the user terminal, source bitrate variability, and Radio Access Network (RAN) congestion level.

15. The method according to claim 14, further comprising playing out the media to the user.

16. The method according to claim 14, further comprising establishing a first security context with the media user agent.

17. The method according to claim 14, wherein the media user client is responsible for user application interface, display and/or speakers of the user terminal, rendering functionality, a playback point and a data buffer, without being responsible for a data representation selection algorithm, and data fetch functionality from the media server.

18. A media user agent device in a network node in a communication network, the media user agent device operable for providing media from a media server to a media user client in a user terminal, the media user agent device being configured to:
receive a request for the media from the media user client, the request for the media comprising information about the requested media,
transmit the request for the media to the media server, the request comprising the information about the requested media,
receive a Media Presentation Description (MPD) from the media server,
autonomously request segment(s) of the media from the media server based on the MPD,
receive a number of the segment(s) of the media from the media server,
maintain a data buffer and a current playback point of the media user client, and
transmit the segment(s) of the media to the media user client in the user terminal based on the current playback point of the media user client and a playout buffer level of the media user client, wherein the playout buffer level depends on mobility of the user terminal, source bitrate variability, and Radio Access Network (RAN) congestion level.

19. The media user agent device according to claim 18, wherein the transmission of the segment(s) of the media to the media user client in the user terminal is further based on information of the user terminal comprised in the received request for the media and status of the data buffer.

20. The media user agent device according to claim 19, further being configured to:
autonomously request additional segment(s) of the media from the media server, based on the MPD and the segment(s) of the media that has been previously transmitted to the media user client in the user terminal, without receiving any request for specific segments from the media user client,
receive the additional segment(s) of the media from the media server, maintain the data buffer and the current playback point of the media user client, and transmit the additional segment(s) of the media to the media user client in the user terminal based on the information of the user terminal, the status of the data buffer, and the current playback point of the media user client.

21. The media user agent device according to claim 20, wherein the autonomous request of the additional segment(s) of the media from the media server and/or the transmission of the additional segment(s) of the media to the media user client in the user terminal is further based on commands received from the media user client, the commands being at least one of: play, pause, stop, fast forward, and rewind.

22. The media user agent device according to claim 18, wherein the media user agent device is configured to autonomously request the segment(s) based on information related to different media rate representations of the segment(s) of the media, and wherein which of the segment(s) is/are requested depends on the different media rate representations of the segment(s) of the media.

23. The media user agent device according to claim 18, wherein the transmission of the segment(s) of the media to the media user client in the user terminal is further based on channel characteristic(s) of a connection between the user terminal and the network node in which the media user agent device is comprised.

24. The media user agent device according to claim 23, wherein the transmission of the segment(s) of the media to the media user client in the user terminal is further based on status of the data buffer, the current playback point, and the channel characteristic(s) of the connection between the network node in which the media user agent device is comprised and the media user client in the user terminal.

25. The media user agent device according to claim 24, wherein the channel characteristic(s) includes congestion level and the mobility of the user terminal in which the media user client is comprised.

26. The media user agent device according to claim 18, further being configured to perform rate adaption based on channel characteristic(s) of a connection between the user terminal and the network node in which the media user agent device is comprised, and based on a connection between the media user agent device and the media server, wherein the segment(s) of the media from the media server are autonomously requested further based on the performed rate adaptation.

27. The media user agent device according to claim 18, further being configured to establish a first security context with the media user client in the user terminal and a second security context with the media server.

28. The media user agent device according to claim 18, further being configured to select a transport layer protocol to be used between the media user client and the media user agent device and a transport layer protocol to be used between the media user agent device and the media server, for transmitting the segment(s) of the media to the media user client in the user terminal based on channel characteristic(s) of connections between the media user client and the media user agent device and between the media user agent device and the media server.

29. The media user agent device according to claim 28, wherein settings for the selected transport layer protocol are determined based on current characteristics of the connections.

30. The media user agent device according to claim 18, wherein the network node in which the media user agent device is comprised is: (i) a base station, (ii) distributed in a Local Service Cloud (LSC), or (iii) a node in a core network part of the communication network.

31. A media user client device in a user device in a communication network, the media user client device operable for providing media to a user of the user device, wherein the media user client device communicates with a media user agent in a node in the communication network, the media user client device being configured to:

receive a request for the media from the user of the user device, transmit the request for the media to the media user agent, the request comprising information about the requested media, wherein said request indicates that the media user agent autonomously requests segment(s) of the media from a media server based on a Media Presentation Description (MPD) received from the media server, and wherein the information included in said request comprises an indication of a playout buffer level of the media user client device, and receive the segment(s) of the media from the media user agent based on a current playback point of the media user client device and the playout buffer level of the media user client device, wherein the playout buffer level depends on mobility of the user device, source bitrate variability, and Radio Access Network (RAN) congestion level.

32. The media user client device according to claim 31, further being configured to play out the media to the user.

33. The media user client device according to claim 31, further being configured to establish a first security context with the media user agent.

34. The media user client device according to claim 31, wherein the media user client device is responsible for user application interface, display and/or speakers of the user device, rendering functionality, a playback point and a data buffer, without being responsible for a data representation selection algorithm, and data fetch functionality from the media server.

* * * * *